W. A. HALL.
GEARING FOR PROPELLERS.
APPLICATION FILED MAR. 29, 1909. RENEWED JAN. 10, 1910.
974,961.
Patented Nov. 8, 1910.
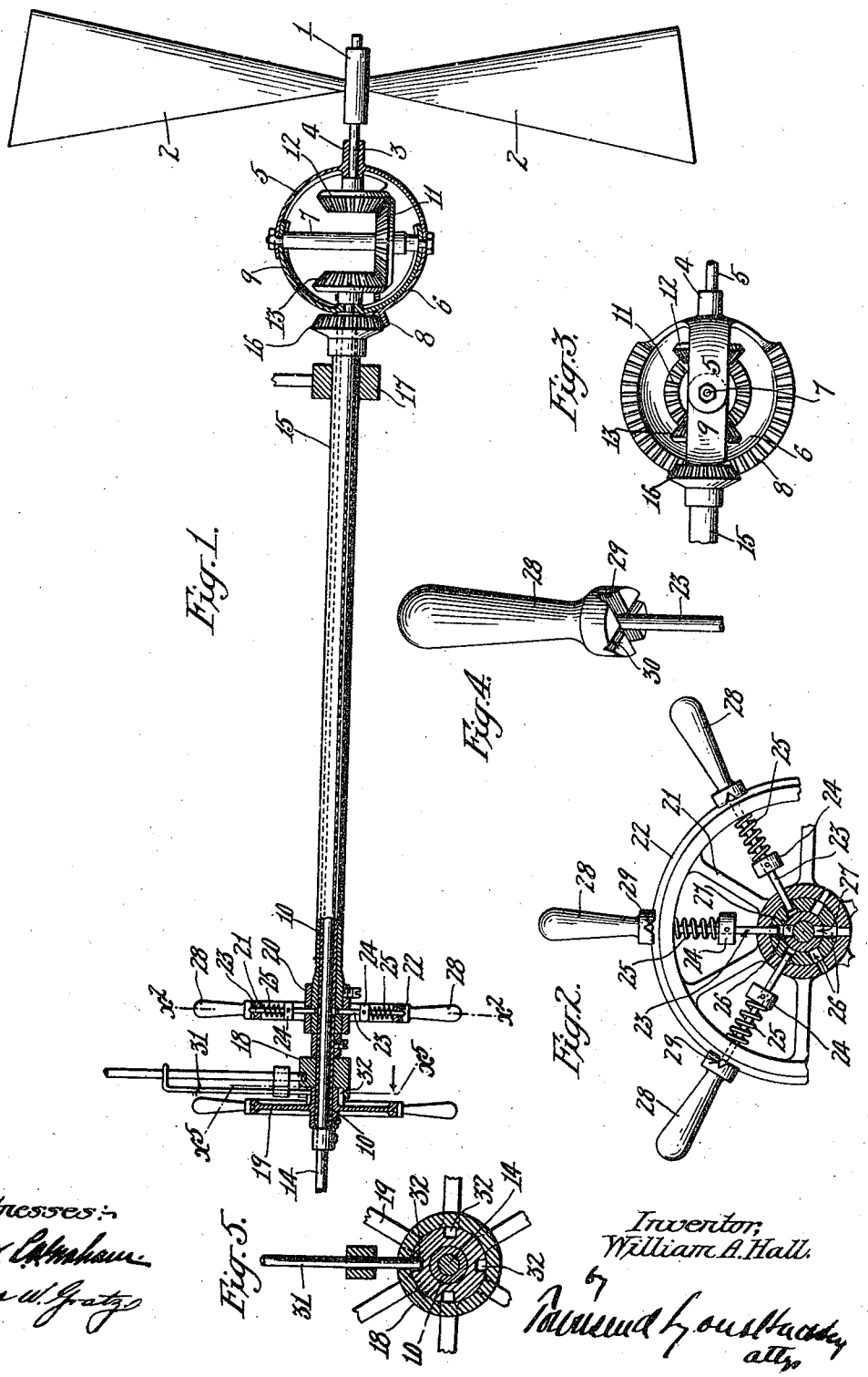
Witnesses:
Inventor,
William A. Hall.

UNITED STATES PATENT OFFICE.

WILLIAM A. HALL, OF LOS ANGELES, CALIFORNIA, ASSIGNOR, BY MESNE ASSIGNMENTS, TO AMERICAN AERIAL COMMERCIAL COMPANY, OF LOS ANGELES, CALIFORNIA, A CORPORATION OF ARIZONA TERRITORY.

GEARING FOR PROPELLERS.

974,961.   Specification of Letters Patent.   Patented Nov. 8, 1910.

Application filed March 29, 1909, Serial No. 486,604. Renewed January 10, 1910. Serial No. 537,350.

*To all whom it may concern:*

Be it known that I, WILLIAM A. HALL, a citizen of the United States, residing at Los Angeles, in the county of Los Angeles and State of California, have invented a new and useful Gearing for Propellers, of which the following is a specification.

This invention relates to propeller gearing adapted for driving and controlling air ship propellers and the like, and the main object of the invention is to provide means for adjusting the propeller so that it will rotate in any plane above or below the center line of the driving shaft or at either side thereof and to permit such adjustment while the propeller is in operation.

Further objects are to provide a device of the character described which is of simple and compact construction having few parts and durable in use.

The accompanying drawing illustrates the invention and referring thereto: Figure 1 is a longitudinal, vertical, sectional view through the invention. Fig. 2 is an enlarged section on line $x^2$—$x^2$ Fig. 1. Fig. 3 is a plan view of the device at the joint. Fig. 4 is a perspective view, in detail, of one of the handles of a controlling wheel. Fig. 5 is a section on line $x^5$—$x^5$ Fig. 1.

1 designates the propeller hub having any desired number or form of blades 2, the hub being mounted on a shaft 3 journaled in a bearing 4 which is formed as part of a yoke 5. The yoke 5 has an extended portion 6 on one side and together with the extension 6 is formed as a portion of a hollow sphere. The yoke 5 is pivoted to the ends of a shaft 7 which extends diametrically of the spherical yoke 5, and the extension 6 is provided with a segment gear 8 which embraces an arc of about 180° and is concentric with the shaft 7. A supporting yoke 9 which is also formed as a portion of a hollow sphere supports the shaft 7, the latter being also diametrically disposed with relation to the supporting yoke 9. The yoke 9 is mounted rigidly on the end of an intermediate tube 10. Mounted on the shaft 7 is an intermediate idle bevel gear 11 which meshes with a bevel gear 12 which is rigid on the shaft 3, and also meshes with a bevel gear 13 which is rigid on a driving shaft 14, the latter being located within the tube 10 and mounted to rotate therein. Outside of the intermediate tube 10 is an outer tube 15, and attached to the rear end thereof is a bevel gear 16 which meshes with the segment gear 8.

17 is a journal for the outer tube 15.

18 is a journal in which the other end of the intermediate tube 10 is mounted, and 19 is a wheel rigidly mounted on the tube 10 for revolubly adjusting the same. The end of the outer tube 15 is enlarged, and rigidly secured thereon is the hub 20 of adjusting wheel 21 the rim of which has a V-shaped rib 22. A series of bolts 23 are slidably mounted radially of the adjusting wheel and have collars 24 against which springs 25 press tending to move the bolts 23 inwardly. The inner ends of the bolts 23 lie in radial holes 26 in the outer tube 15. Radial holes 27 are formed in the intermediate tube 10 and are adapted to receive the inner ends of bolts 23 when the latter are permitted to enter.

A handle 28 is formed on the outer end of each bolt 23 and as clearly shown in Fig. 4 the inner end of each handle has two diametrical grooves 29, 30, the groove 29 being deeper than the groove 30. When the handle 28 is so turned that the groove 30 rests upon the V-rib 22 the associated bolt 23 is held out of engagement with a hole 27 in the intermediate tube 10, while when the handle 28 is turned so that the deep groove 29 rests on the V-rib 22 the associated bolt then lies in a hole 27. When all of the bolts 23 are disengaged from the intermediate tube 27 by rotating the wheel 21 the outer tube 15 may be turned, which through the medium of bevel gear 16 and segment gear 8 will swing the yoke 5 on the shaft 7 and move the shaft 3 into angularity with the axis of the driving shaft 14. If the wheel 19 is held stationary to hold the intermediate tube 10 and yoke 9 stationary with the shaft 7 in a vertical position, and the wheel 21 is then turned to adjust the yoke 5, it is obvious that the shaft 3 will be adjusted in a horizontal plane and that by turning the wheel 19 one-quarter around so that the shaft 7 is horizontal and then adjusting the yoke 5 the latter will be adjusted in a vertical plane. Obviously the plane of adjustment of the shaft 3 may be produced at any point within a complete circle which may be secured by adjusting the wheel 19. The adjustability of the shaft 7 is always in a vertical plane, that is, assuming the driving shaft 14 to be arranged in a horizontal position, and the adjustment of the shaft 3 is always in a plane at right angles to the shaft 7. Therefore as the shaft 7 is adjustable through a complete circle it is possible to adjust the shaft 3 into any desired angle of inclination in any direction with respect to the driving shaft 14 and that during all such adjustments the gears always remain in mesh and the operation of the propeller is uninterrupted. When the desired angularity of the shaft 3 with respect to the shaft 7 has been secured by means of the wheel 21 any one of the handles 28 may be turned to bring its deep groove 29 on the rib 22 which will cause the associated bolt 23 to lock into a hole 27 in the intermediate tube, whereupon further adjustment of the wheel 21 will act to adjust the shaft 7 without disturbing the angularity of the shaft 3 with relation thereto.

In order to hold the wheel 19 from turning and relieve the operator from having to hold it still while adjusting the wheel 21 a sliding bolt 31 is employed which is adapted to engage in any one of a series of notches 32 formed in the hub of the wheel 19.

What I claim is:—

1. Two yokes pivoted together, a driven shaft in one yoke, a bevel gear on said shaft, an idle gear carried by one of said yokes meshing with the first gear, a driving shaft journaled in the other yoke, a bevel gear on the driving shaft meshing with the idle gear, a segment gear on the yoke which carries the driven shaft, an intermediate tube attached to the other yoke, an outer tube, and a gear on the outer tube meshing with the segment gear.

2. Two yokes pivoted together, a driven shaft in one yoke, a bevel gear on said shaft, an idle gear carried by one of said yokes meshing with the first gear, a driving shaft journaled in the other yoke, a bevel gear on the driving shaft meshing with the idle gear, a segment gear on the yoke which carries the driven shaft, an intermediate tube attached to the other yoke, an outer tube, a gear on the outer tube meshing with the segment gear, a wheel on the intermediate tube, and a wheel on the outer tube.

3. Two yokes pivoted together, a driven shaft in one yoke, a bevel gear on said shaft, an idle gear carried by one of said yokes meshing with the first gear, a driving shaft journaled in the other yoke, a bevel gear on the driving shaft meshing with the idle gear, a segment gear on the yoke which carries the driven shaft, an intermediate tube attached to the other yoke, an outer tube, a gear on the outer tube meshing with the segment gear, a wheel on the intermediate tube, a wheel on the outer tube, and means for detachably locking the latter wheel to the intermediate tube.

4. Two yokes pivoted together, a driven shaft in one yoke, a bevel gear on said shaft, an idle gear carried by one of said yokes meshing with the first gear, a driving shaft journaled in the other yoke, a bevel gear on the driving shaft meshing with the idle gear, a segment gear on the yoke which carries the driven shaft, an intermediate tube attached to the other yoke, an outer tube, a gear on the outer tube meshing with the segment gear, and means for detachably locking both tubes together.

5. Two yokes pivoted together, a driven shaft in one yoke, a bevel gear on said shaft, an idle gear carried by one of said yokes meshing with the first gear, a driving shaft journaled in the other yoke, a bevel gear on the driving shaft meshing with the idle gear, a segment gear on the yoke which carries the driven shaft, an intermediate tube attached to the other yoke, an outer tube, a gear on the outer tube meshing with the segment gear, a wheel on the intermediate tube, a wheel on the outer tube, a series of spring pressed slidable bolts in the latter wheel, the intermediate tube having holes adapted to be engaged by said bolts, handles on the bolts, and means for holding said handles at various distances from the axis of their wheel.

6. Two yokes pivoted together, a driven shaft in one yoke, a bevel gear on said shaft, an idle gear carried by one of said yokes meshing with the first gear, a driving shaft journaled in the other yoke, a bevel gear on the driving shaft meshing with the idle gear, a segment gear on the yoke which carries the driven shaft, an intermediate tube attached to the other yoke, an outer tube, a gear on the outer tube meshing with the segment gear, a wheel on the intermediate tube, a wheel on the outer tube, a series of spring pressed slidable bolts in the latter wheel, the intermediate tube having holes adapted to be engaged by said bolts, and handles on the bolts, each handle having two diametrical grooves on its inner end, one groove being deeper than the other, said grooves detachably engaging the rim of the wheel.

In testimony whereof, I have hereunto set my hand at Los Angeles, California, this 9th day of March 1909.

WILLIAM A. HALL.

In presence of—
G. F. HACKLEY,
FRANK L. A. GRAHAM.